(12) United States Patent
Roberts

(10) Patent No.: US 7,069,539 B1
(45) Date of Patent: Jun. 27, 2006

(54) APPROACH FOR IMPLEMENTING POLICY CONSTRAINTS IN APPLICATIONS

(75) Inventor: Kenneth John Roberts, San Jose, CA (US)

(73) Assignee: Cisco Technology, Inc, San Jose, CA (US)

( * ) Notice: Subject to any disclaimer, the term of this patent is extended or adjusted under 35 U.S.C. 154(b) by 737 days.

(21) Appl. No.: 10/015,056

(22) Filed: Dec. 10, 2001

(51) Int. Cl.
*G06F 9/44* (2006.01)

(52) U.S. Cl. ............... 717/110; 717/120; 717/162; 719/316; 719/330

(58) Field of Classification Search ........ 717/106–108, 717/114–116, 120–122, 110, 162; 709/217; 706/45; 719/315–316, 310, 330
See application file for complete search history.

(56) References Cited

U.S. PATENT DOCUMENTS

| | | | |
|---|---|---|---|
| 5,513,350 A * | 4/1996 | Griffin et al. ............. | 717/106 |
| 6,070,197 A * | 5/2000 | Cobb et al. ................ | 719/315 |
| 6,230,312 B1 * | 5/2001 | Hunt ......................... | 717/108 |
| 6,438,590 B1 * | 8/2002 | Gartner et al. ............ | 709/219 |
| 6,473,748 B1 * | 10/2002 | Archer ..................... | 706/45 |
| 6,473,791 B1 * | 10/2002 | Al-Ghosein et al. ...... | 709/217 |
| 6,487,716 B1 * | 11/2002 | Choi et al. ................ | 717/159 |
| 6,505,210 B1 * | 1/2003 | Frey et al. ............. | 707/103 R |
| 6,567,818 B1 * | 5/2003 | Frey et al. ............. | 707/103 R |
| 6,681,380 B1 * | 1/2004 | Britton et al. ............ | 717/115 |

OTHER PUBLICATIONS

Alhusaini et al. "A framework for mapping with resource co-allocation in heterogeneous computing systems" 2000 IEEE, pp. 1-14.*

Liu et al. "An agent based architecture for supporting application level security" 2000 IEEE, pp. 1-12.*

* cited by examiner

*Primary Examiner*—William Thomson
*Assistant Examiner*—Van Nguyen
(74) *Attorney, Agent, or Firm*—Hickman Palermo Truong & Becker, LLP

(57) ABSTRACT

An approach for implementing policy controls in application programs provides for the execution of code to implement policy constraints in a manner that is generally transparent to application programmers. According to the call redirection approach, routine calls are redirected to a policy broker mechanism. The policy broker mechanism causes one or more policy constraints to be applied and if appropriate, causes the routine targeted by the routine call to be executed. According to the code substitution approach, the code for software application routines for which policy constraints are to be applied is substituted with code that provides for the application of policy controls. The code that performs the original functions may also be maintained, but augmented with additional code to apply policy constraints. Thus, routines normally invoked by application programs, for example, code libraries, do not have to be modified by application programmers to include code to apply policy controls.

8 Claims, 6 Drawing Sheets

APPROACH FOR IMPLEMENTING POLICY CONSTRAINTS IN APPLICATIONS

FIELD OF THE INVENTION

The present invention relates generally to the application of policies, and more particularly, to an approach for implementing policy constraints in computer software application programs.

BACKGROUND OF THE INVENTION

One ongoing problem in developing computer software application programs is how to implement policy constraints. As used herein, the term "policy" is used broadly to refer to any rule or condition that can be applied to data. Example policies include, without limitation, network management policies, data access policies and security policies. The particular policies implemented for application programs vary widely depending upon the requirements and context of a particular application program.

Policy constraints are conventionally applied to application programs by an application programmer who updates application program code to include "calls", or invocations, to policy routines. The application programmer typically also adds program logic statements to the application program code in association with the calls to the policy routines. The purpose of the program logic statements is to make the execution of a set of code statements conditioned upon a particular result of calling a policy routine. For example, policy routines commonly return a value that indicates the result of applying a set of policy constraints. The return value is examined and particular steps are taken by the application program depending upon the particular return value.

For example, suppose that an application programmer updates an application program to include a call to an authentication routine to authenticate a particular user. The authentication routine applies a set of policy constraints and returns a value that specifies a level of access that should be provided to the particular user. For example, the authentication routine may verify the identity of the particular user and then check the access rights of the particular user. Application program logic, e.g., a "switch" statement in the programming language C, then processes the return value and determines an appropriate action to be taken based upon the level of access specified for the particular user.

The policy routines themselves may be linked into an application program executable, for example by being included in a routine library. Alternatively, policy routines may instead be located on a remote node in distributed computing applications and invoked using a remote procedure call (RPC) mechanism.

Consider the following example. FIG. 1 is a block diagram that depicts a conventional arrangement 100 for implementing policies in application programs. An application program 102 includes program code that invokes general routines 104 to perform the functions generally required by application program 102, such as data processing and input/output (I/O) operations. General routines 104 may include "low level" routines, such as operating system I/O routines and device drivers, as well as higher-level routines that may themselves call the low level routines. General routines 104 are generally developed separately from the program code contained in application program 102 and then linked into application program 102.

Application program 102 invokes policy routines 106 to apply policy constraints. For example, application program 102 may invoke an authorization routine from policy routines 106 to authenticate a user. Based upon the results of executing the authorization routine, program logic contained in application program 102 either allows or disallows certain functionality.

Although application program 102, general routines 104 and policy routines 106 are depicted in FIG. 1 as separate entities, in practice, general routines 104 and policy routines 106 may be part of application program 102. This may be accomplished, for example, using a variety of techniques, such as a linked code library. In this context, links 108, 110 are typically one or more names or addresses associated with general routines 104 and policy routines 106. Alternatively, in a distributed computing environment, general routines 104 and policy routines 106 may be located on different nodes than the node on which application program 102 resides and may be invoked using remote invocation techniques, such as an RPC mechanism. In this context, links 108, 110 may be implemented by any medium or mechanism that provides for the exchange of data between A and B. Examples of links 108, 110 include, without limitation, a network such as a Local Area Network (LAN), Wide Area Network (WAN), Ethernet or the Internet, or one or more terrestrial, satellite or wireless links.

One significant drawback of the aforementioned conventional approach for applying policy constraints in application programs is that the approach is generally very intrusive because it requires making the application program code policy "aware." In other words, the application program code must be updated to include the functionality associated with applying the desired policy constraints. This requires the application programmer to know what policy routines need to be called, and under what conditions, to apply particular policy constraints. The application programmer must also modify the application program code to include program logic to process the return codes provided by the policy routines. If new policy constraints are added, then the application program code must be updated to handle the new constraints. These tasks place a large burden on application programmers and are very intrusive.

Based upon the foregoing, there is a need for an approach for applying policy constraints in application programs that does not suffer from the limitations of prior approaches.

There is a particular need for an approach for applying policy constraints in application programs that is less intrusive to application programs than conventional approaches.

There is a further need for an approach for applying policy constraints in application programs that provides for separation of the functionality associated with applying policy constraints from application program code.

SUMMARY OF THE INVENTION

According to one aspect of the invention, a method is provided for applying one or more policy constraints in an application program. The method includes redirecting a request to invoke a routine contained in the application program to a policy broker without modifying program code contained in the application program that invokes the routine. Processing of the request to invoke the routine by the policy broker causes the policy constraints to be applied to invocation of the routine. A variety of techniques may be used to redirect the request to invoke the routine to the policy broker and the invention is not limited to any particular technique. Example techniques include, without limitation, encapsulation and code substitution.

According to another aspect of the invention, a method is provided for implementing policy constraints in an application program. The method includes identifying a routine in the application program for which one or more policy constraints are to be applied. The routine is invoked by program code contained in the application program. Without modifying the program code, replacement code is substituted for original code contained in the identified routine. Execution of the replacement code by one or more processors causes the one or more policy constraints to be applied.

BRIEF DESCRIPTION OF DRAWINGS

The present invention is depicted by way of example, and not by way of limitation, in the figures of the accompanying drawings and in which like reference numerals refer to similar elements in which.

DETAILED DESCRIPTION OF THE INVENTION

In the following description, for the purposes of explanation, numerous specific details are set forth in order to provide a thorough understanding of the present invention. It will be apparent, however, that the present invention may be practiced without these specific details. In other instances, well-known structures and devices are depicted in block diagram form in order to avoid unnecessarily obscuring the present invention. Various aspects of the invention are described in the following sections: 1) Overview; 2) Call Redirection; 3) Code Substitution; and 4) Implementation Mechanisms.

1) Overview

A novel approach is provided for implementing policy controls in application programs that avoids limitations in prior approaches. The approach provides for the execution of code to implement policy constraints in a manner that is generally transparent to application program code and application programmers. Thus, application programmers do not have to update application program code to include code to implement policy controls, for example, special calls to policy routines. Similarly, routines normally invoked by application programs, for example code libraries, do not have to be modified by application programmers to include code to apply policy controls.

A variety of techniques may be employed to implement the aforementioned approach depending upon the requirements of a particular application and the invention is not limited to any particular technique. Embodiments of the invention are described hereinafter in the context of a call redirection technique and a code substitution technique.

2) Call Redirection

Figure 1:
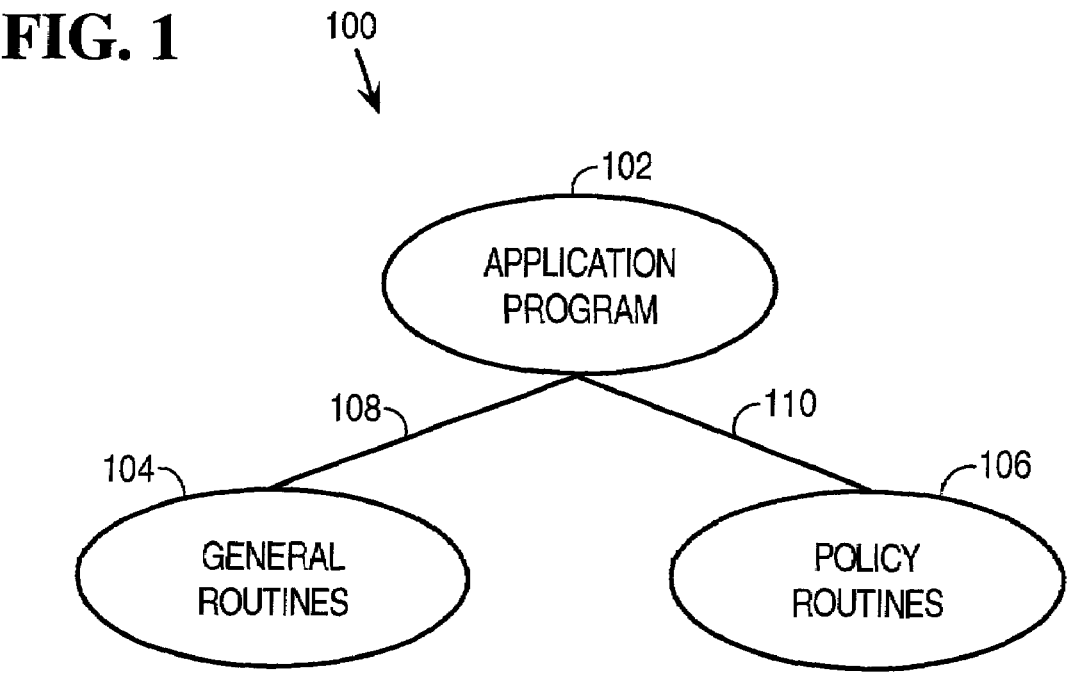
FIG. 1 is a block diagram that depicts a conventional arrangement for implementing policy constraints in application programs.
Figure 2:
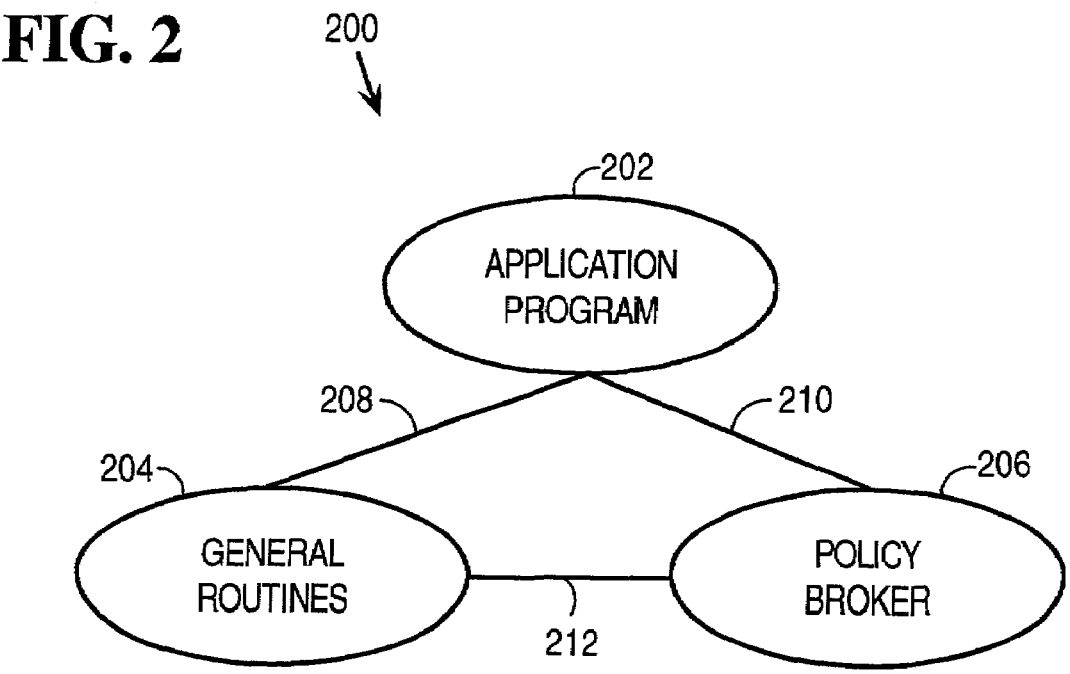
FIG. 2 is a block diagram that depicts an arrangement for implementing policy constraints according to an embodiment.

According to the call redirection approach, routine calls are redirected to a policy broker mechanism. The policy broker mechanism causes one or more policy constraints to be applied and if appropriate, also causes the routine targeted by the routine call to be executed. FIG. 2 is a block diagram 200 that depicts an arrangement for implementing policy constraints according to the redirection approach. An application program 202 invokes general routines 204 to perform a set of desired functions.

According to one embodiment, when the application of policy constraints is desired for a particular routine in general routines 204, the invocation of the particular routine, e.g., the routine call, is redirected to a policy broker 206. Policy broker 206 applies one or more policy constraints. Policy broker 206 may also cause the particular routine to be invoked, or not, depending upon the results of applying the policy constraints.

Figure 3A:
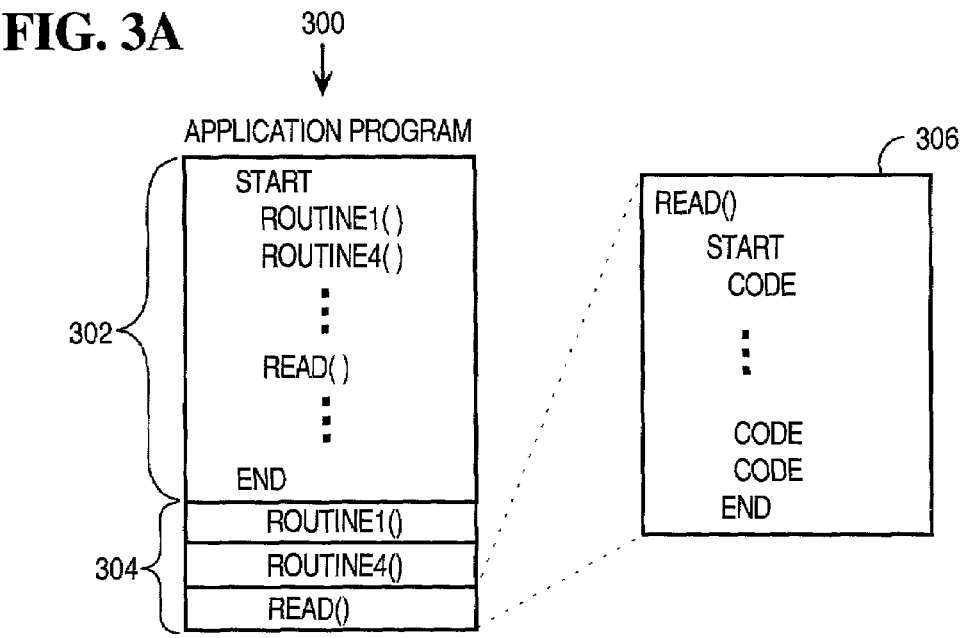
FIG. 3A is a block diagram that depicts a conventional application program that includes program code and a set of routines.

Consider the following example. FIG. 3A is a block diagram that depicts a conventional application program 300 that includes program code 302 and a set of routines 304. Program code 302 characteristically includes code that identifies the start and end of program code 302. This code is depicted in FIG. 3A as "START" and "END." Program code 302 also includes calls to routines "ROUTINE1( )", "ROUTINE4( )" and "READ( )" from routines 304. Program code 302 may include other code, such as program logic and calls to other routines, that is not depicted in FIG. 3B for purposes of explanation. Routine calls conventionally include any number of parameters that "pass" data to the called routine, i.e., by including as a parameter either an actual data value or a reference that specifies where data is located. For purposes of explanation, the calls in program code 302 are depicted with no parameters. Program code 302 may contain additional code and special formatting depending upon the requirements of a particular application and the invention is not limited to any particular programming language.

In the present example, routines 304 include routines identified as "ROUTINE1( )", "ROUTINE4( )" and "READ( )" that are invoked by program code 302. For purposes of illustration, only the name of the routines contained in routines 304 are illustrated. In practice, each routine in routines 304 includes a set of code statements to perform one or more functions. In the present example, the code for the routine READ includes START, END and CODE statements, as indicated by reference numeral 306. The CODE statements may be any type of program code, for example, program logic statements or calls to other routines.

According to the call redirection approach, a determination is made as to which routines from routines 304 policy controls are to be applied. The decision criteria used to make this decision may vary depending upon the requirements of a particular application and the invention is not limited to any particular decision criteria. For example, a determination may be made that policy controls are to be applied to certain routines relating to data access and security. The decision criteria may also include user-specified criteria, such as routine attributes or even the names of specific routines.

In the present example, it is presumed that a determination has been made that policy controls are to be applied to the READ routine from routines 304. The READ routine might provide for reading data from a data source, such as a database system. The READ routine might be, for example, an operating system level routine or primitive. Access to data from the data source may be restricted to a class or group of users and a determination is therefore made that a user is to be authenticated prior to allowing execution of the READ routine.

Conventionally, program code 302 would be modified to include program logic and/or calls to one or more policy routines to authenticate users. The policy routines would return results to program code 302, for example in the form of return codes. The program code would process the return codes and the invocation of the READ routine would be conditioned upon the values of the return codes. As previously explained herein, this requires that program code 302 contain the calls to the policy routines and the program logic to process the return codes. Thus, with conventional prior approaches, functionality associated with the application of the policy constraints is part of program code 302.

Figure 3B:
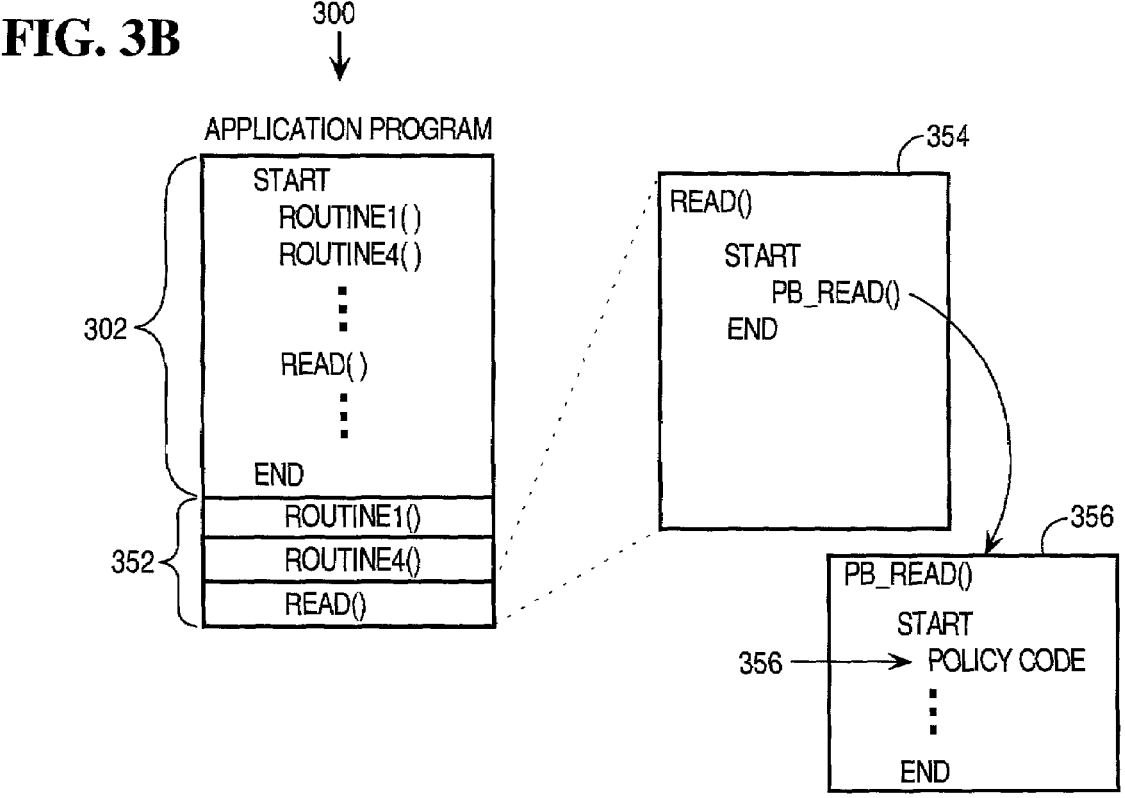
FIG. 3B is a block diagram that depicts a portion of the set of routines depicted in FIG. 3A after being modified by the call redirection approach, according to an embodiment.

According to the call redirection approach, one or more portions of routines 304 are modified to provide for call redirection. As depicted in FIG. 3B, the code for the READ routine 306 has been substituted with replacement code 354. Replacement code 354 contains a call to an alias routine designated PB_READ routine 356. Thus, a call to the READ routine is redirected to PB_READ routine 356. In the present example, PB_READ routine 356 is managed by policy broker 206. For example, the PB_READ routine 356 may reside on the same node as policy broker 206 or may otherwise be controlled or managed by policy broker 206.

For purposes of explanation, replacement code 354 is depicted in FIG. 3B as containing only a call to the PB_READ routine 356, although the invention is not limited to this example. Replacement code 354 may contain other code in addition to the call to the PB_READ routine depending upon the requirements of a particular application. The name "PB-READ" is an example and is not required.

According to the call redirection approach, invocation of the PB_READ routine 356 causes policy constraints to be applied to application program 300. This may include, for example, the execution of program logic or calls to other routines contained in the PB_READ routine, as represented by POLICY CODE 358. It may also include execution of the original READ routine 306, or the code contained in the original READ routine 306, depending upon the requirements of a particular application. In one embodiment, a user code issues the required primitive using its conventional label. This calls an embedded procedure that, without interception, directly calls or links to a native host OS function. Within a policy-enabled system the local linked procedure redirects the request to the Policy Broker, using an encapsulated PB_action method. The PB then executes the specified policy code that describes what an administrator has designed for the constraint checking. Since each successive call uses encapsulation the original request can be re-constituted after passing all constraints and issued, by proxy, by the PB on behalf of the original requester. Responses follow a reverse path back to the original requester and, may themselves be subject to application of policy.

This sequence may be used with objects in a similar way. The "instance identifier" returned from a CORBA BIND or Java (/NEW) operation is the PB_object. Method invocation within the PB_object instance can be direct (that is, a PB method correlation exists for each user operation) or indirect (via a "default" method within the PB_object instance that falls through SWITCH statement.) The CORBA BIND and Java location services are proxied within the local user address space using RPC encapsulation.

Thus, the call redirection approach separates the functionality associated with applying one or more policy constraints from program code 302. This is advantageous because it provides for the application of policy constraints without requiring any changes to program code 302, since the interface to the READ routine remains unchanged. Similarly, an application programmer does not have to manually update the READ routine in routines 352, since the inclusion in routines 352 of replacement code 354 may be performed transparent to an application programmer. For example, replacement code 354 may be included in a dynamic linked library that is linked into application program 300 during the build of application program 300. Other types of so-called "late binding" may be used to include replacement code 354 in application program 300.

Figure 3C:
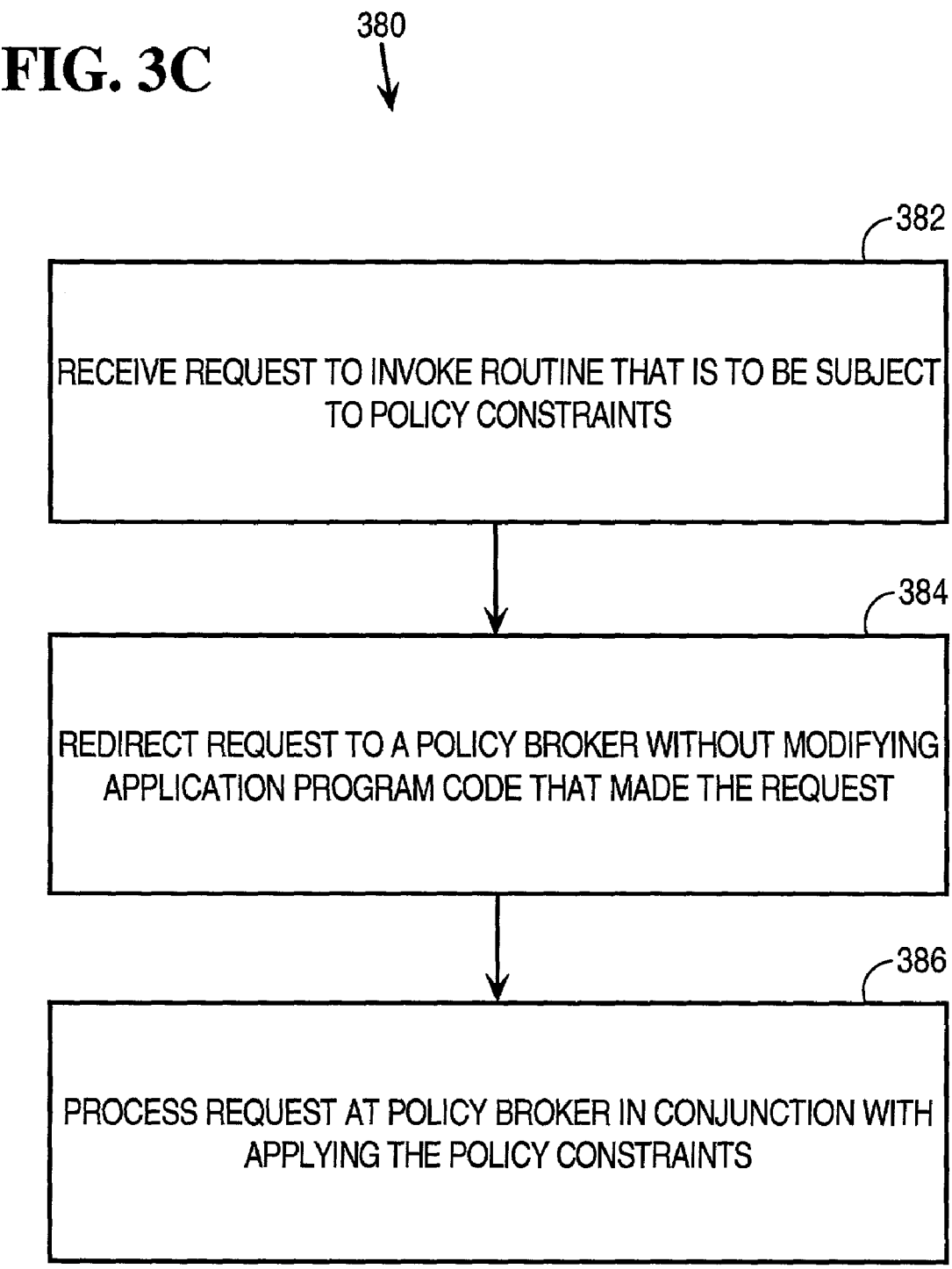
FIG. 3C is a flow diagram that depicts an approach for implementing policy constraints in conjunction with the execution of a routine using call redirection according to an embodiment.

FIG. 3C is a flow diagram 380 that depicts the call redirection approach for applying policy constraints to a routine according to an embodiment. In step 382, a request is received to invoke a routine that is to be subject to policy constraints. In step 384, the request is redirected to a policy broker without modification to the application program code that contained the call to the routine. In step 386, the request is processed at the policy broker in conjunction with the application of the policy constraints.

Policy broker 206 may be implemented as a process or mechanism separate from application program 202 and may reside on the same node as application program 202. Alternatively, policy broker 206 may reside on a different node than the node on which application program 202 resides, e.g., in a distributed computing environment.

3) Code Substitution

According to a code substitution approach, the code for software application routines for which policy constraints are to be applied is substituted with code that provides for the application of policy controls. The code that performs the original functions may also be maintained, but augmented with additional code to apply policy constraints.

Figure 4A:
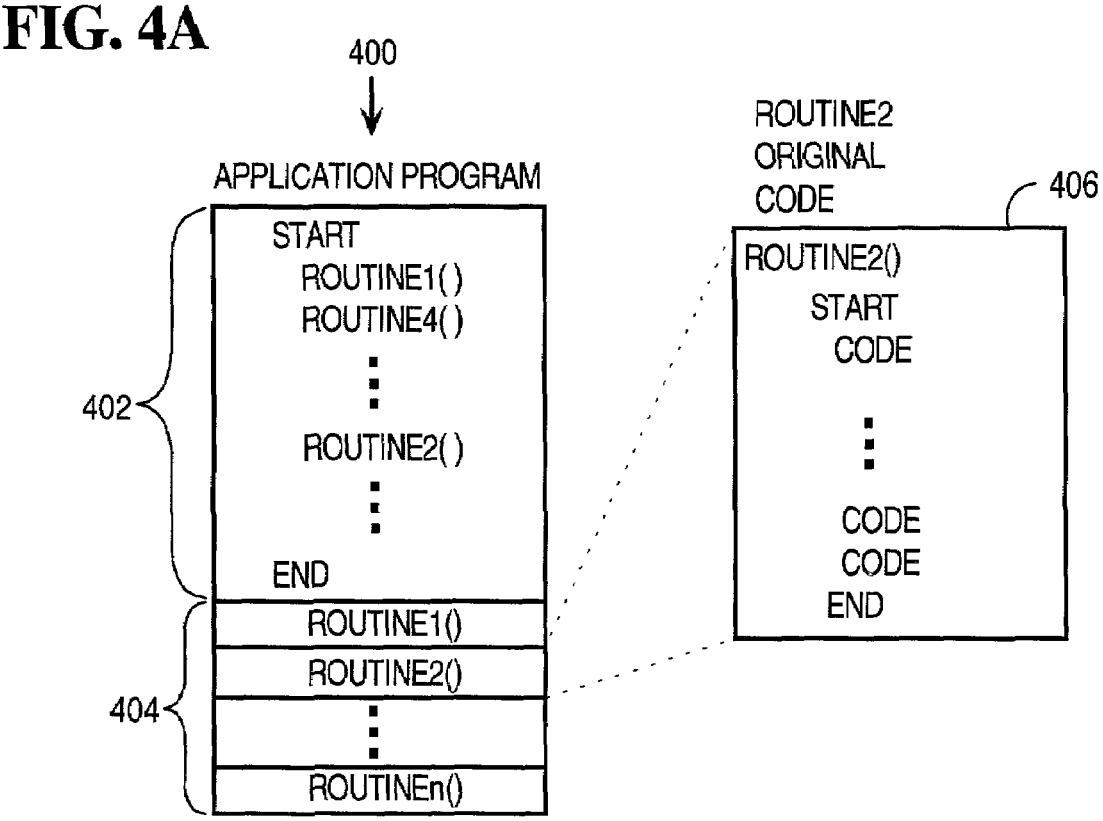
FIG. 4A is a block diagram that depicts a conventional application program that includes program code and a set of routines.

FIG. 4A is a block diagram that depicts an application program 400 that includes program code 402 and a set of routines 404. As is conventional with application programs, program code 402 includes code that identifies the start and end of program code 402. This code is depicted in FIG. 4A as "START" and "END." Program code 402 also includes code, commonly referred to as "calls", to invoke routines 404. This code is depicted in FIG. 4A as "ROUTINE1( )", "ROUTINE4( )" AND "ROUTINE2( )". Calls may include any number of parameters depending upon the requirements of a particular application. Program code 402 may contain additional code and special formatting depending upon the requirements of a particular application and the invention is not limited to any particular programming language.

Routines 404 includes a set of code routines designated as "ROUTINE1" through "ROUTINEn" that are invoked by calls contained in program code 402. For purposes of illustration, only the name of the routines contained in routines 404 are illustrated. In practice, each routine in routines 404 includes a set of code statements to perform one or more functions. For example, as indicated by reference numeral 406, the original code for ROUTINE2 includes START, END and CODE statements.

According to the code substitution approach, a determination is made as to which routines from routines 404 policy controls are to be applied. The criteria used to make this decision may vary depending upon the requirements of a particular application and the invention is not limited to any particular decision criteria. For example, a determination may be made that policy controls are to be applied to certain routines relating to data access and security. Once a set of routines has been identified, the code for the set of routines is substituted with code that provides for the application of policy controls.

Figure 4B:
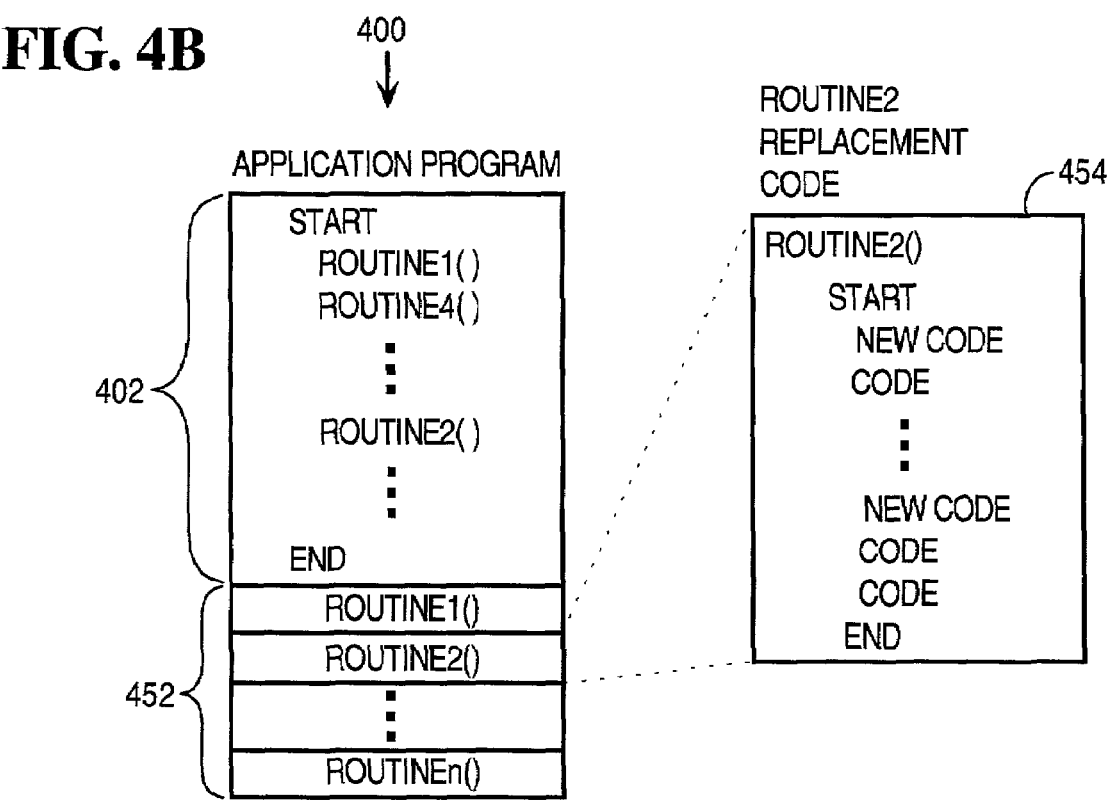
FIG. 4B is a block diagram that depicts a portion of the set of routines depicted in FIG. 4A after being modified by the code substitution approach, according to an embodiment.

In the present example, as depicted in FIG. 4B, one or more portions of routines 404 are substituted with replacement routine code. Specifically, the original code 406 for ROUTINE2 is substituted by replacement code 454, as depicted in FIG. 4B. Replacement code 454 may contain any portions or all of original code 406, as well as additional code not present in original code 406, depending upon the requirements of the present application. In the present example, for purposes of explanation only, replacement code 454 contains all of original code 406, as well as additional code, identified as "NEW CODE."

According to one embodiment, the NEW CODE provides for the application of one or more policy controls. For example, the NEW CODE may include program logic that determines when and if other code contained in replacement code 454 is executed. The NEW CODE may also include calls to other routines to invoke policy constraints.

According to one embodiment, code substitution is made without changing the call structure of routines 452. In the present example, the substitution of replacement code 454 for original code 406 is made without changing the calling interface to ROUTINE2. This allows the code substitution to be made transparent to the application programmer by allowing program code 402 to remain unchanged.

Consider the code substitution approach in the context of the following example. Suppose that ROUTINE2 is a READ routine that allows data to be read from a data source, such as a storage unit. In this situation, original code 406 contains the code necessary to perform a read operation from the storage device. This code might include, for example, code to open a connection to the storage device, read data from the storage device and close the connection to the storage device. According to the code substitution approach, the NEW CODE contained in replacement code 454 provides for the application of policy controls. For example, the NEW CODE might contain program logic that makes reading data from the storage device conditioned upon a successful authentication of a user.

According to one embodiment, replacement code 454 generates a return code and provides the return code to program code 402 for processing. In the event that the user is not successfully authenticated, the NEW CODE sets the value of the return code to indicate that the authentication was unsuccessful. Since program code 402 is unaware that the execution of ROUTINE2 involved any user authentication, a return code value for a general error may be used.

Figure 4C:
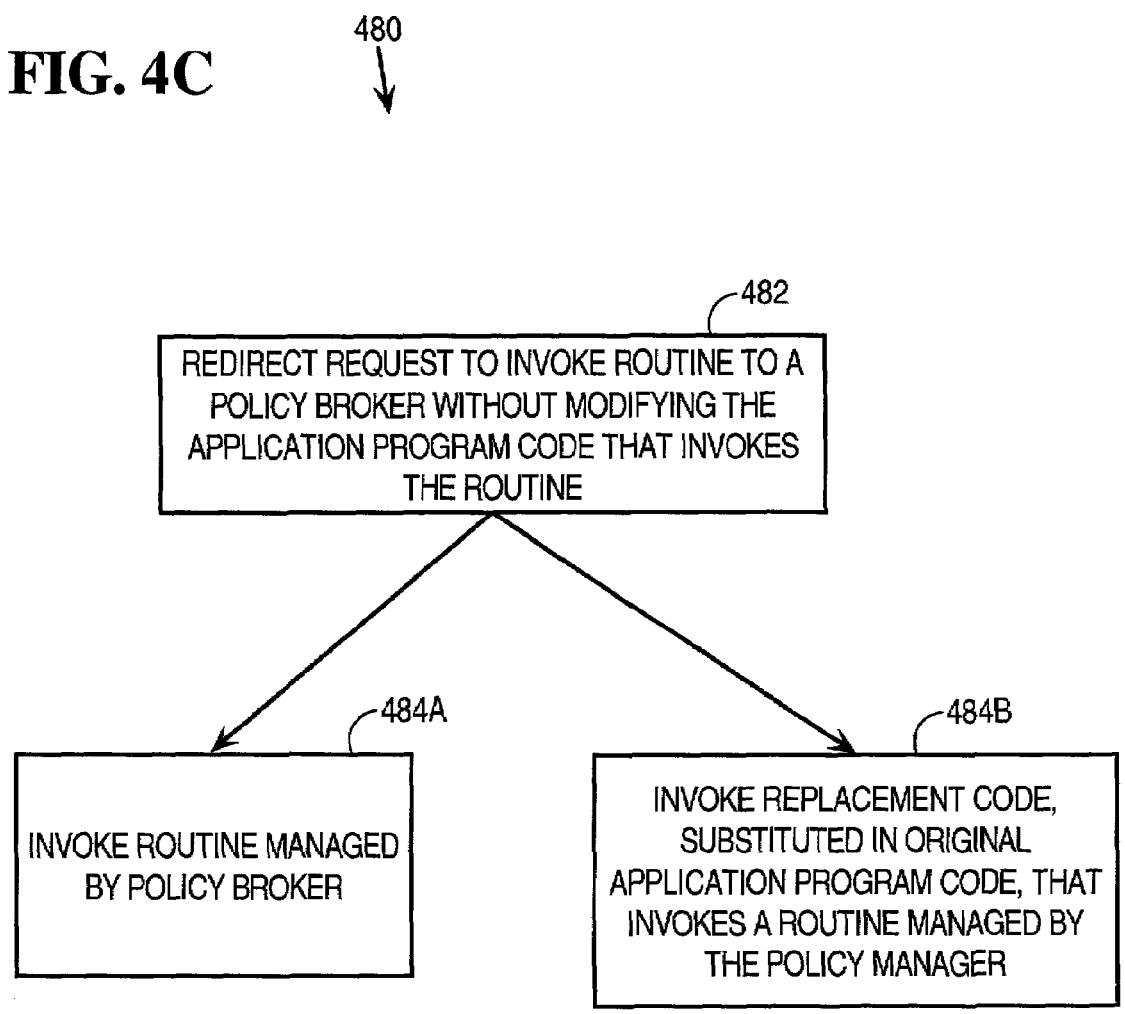
FIG. 4C is a flow diagram that depicts an approach for implementing policy constraints in conjunction with the execution of a routine using code substitution according to an embodiment.

FIG. 4C is a flow diagram 480 that depicts the code substitution approach for applying policy constraints to a routine according to an embodiment. In step 482, a request to invoke a routine is redirected to a policy broker without modifying the application program code that invokes the routine. In step 484A, the routine is invoked and managed by the policy broker. Alternatively, in step 484B, replacement code is invoked that was substituted for the original application program code. The replacement code invokes one or more routines managed by the policy broker.

The code substitution approach may be implemented in different ways and at different times depending upon the requirements of a particular application and the invention is not limited to any particular implementation or time. For example, the code replacement approach may be implemented at the source code, object code, microcode or binary code level. For code languages that require assembling or compiling, code substitution may be performed prior to assembling or compiling routines 404. In this situation, replacement code 454 is included in routines 452 at the time routines 452 are assembled or compiled. Alternatively, replacement code 454 may be separately compiled and then linked into the program executable. In situations where routines 452 are in the form of a library, code substitution may occur prior to or during the building of the library, which is typically performed separately from or in parallel with compiling program code 402. Alternatively, a library containing the compiled replacement code 454 may be separately built and then linked into the program executable.

The approach described herein for applying policy constraints to application programs has several significant advantages over prior approaches. First, the approach is implemented generally transparent to application programmers. Thus, application software programmers do not have to know how to code application software to implement policy constraints.

4) Implementation Mechanisms

The approaches described herein for applying policy constraints to application programs may be implemented in a variety of contexts and mechanisms depending upon the requirements of a particular application and the invention is not limited to any particular context or implementation mechanisms. Embodiments may be implemented in computer hardware, computer software, or any combination of computer hardware and computer software. For example, the code substitution approach may be implemented in computer software executing on a generic processing platform. As another example, the code substitution approach may be implemented by an apparatus configured to perform the code substitution.

Figure 5:
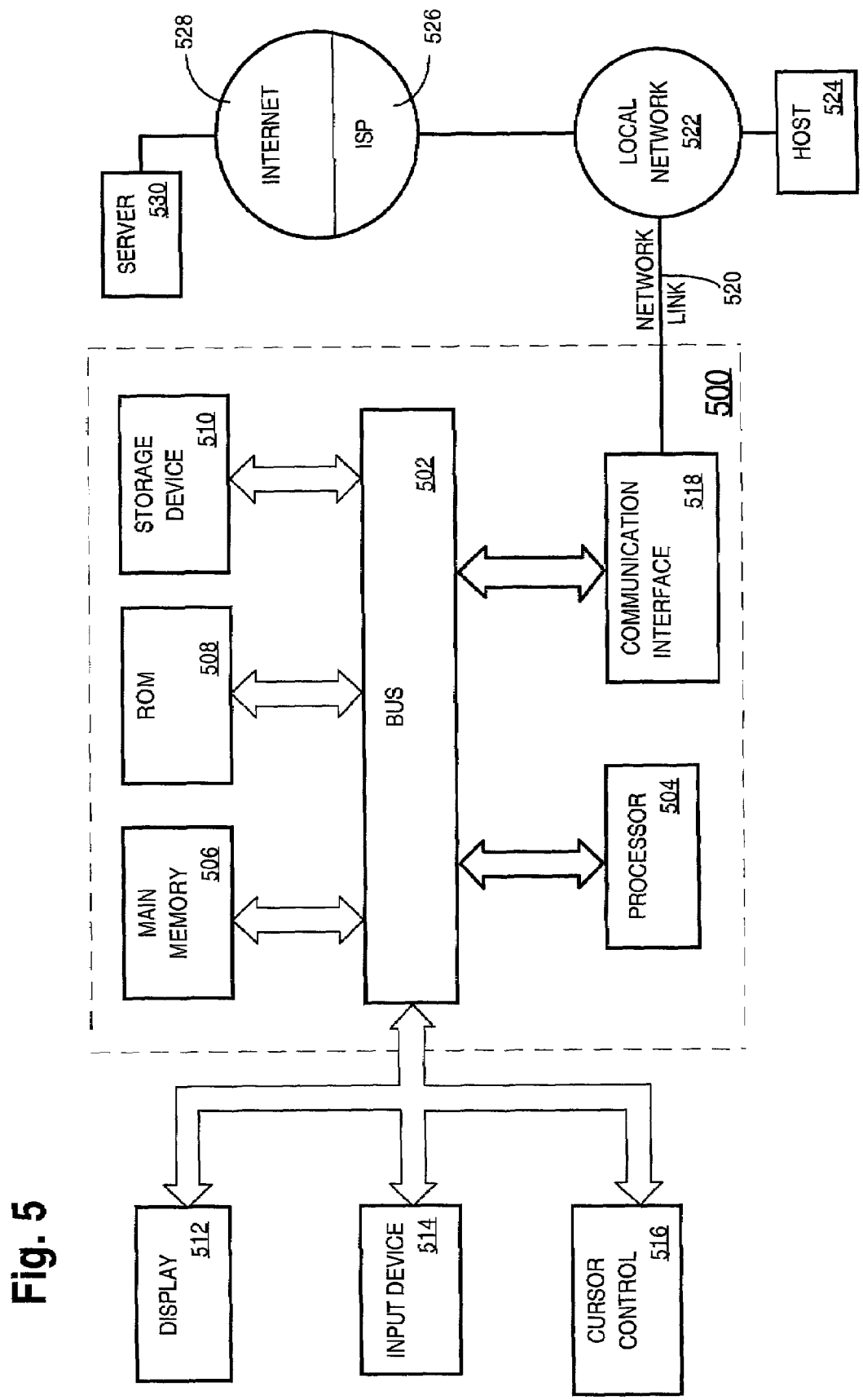
FIG. 5 is a block diagram that depicts an example computer system on which embodiments may be implemented.

FIG. 5 is a block diagram that illustrates a computer system 500 upon which an embodiment of the invention may be implemented. Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for implementing policy constraints in application programs. According to one embodiment of the invention, implementation of policy constraints in application programs is provided by computer system 500 in response to processor 504 executing one or more sequences of one or more instructions contained in main memory 506. Such instructions may be read into main memory 506 from another computer-readable medium, such as storage device 510. Execution of the sequences of instructions contained in main memory 506 causes processor 504 to perform the process steps described herein. One or more processors in a multi-processing arrangement may also be employed to execute the sequences of instructions contained in main memory 506. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infrared transmitter to convert the data to an infrared signal. An infrared detector coupled to bus 502 can receive the data carried in the infrared signal and place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the worldwide packet data communications network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518. In accordance with the invention, one such downloaded application provides for the application of policy constraints in application programs as described herein.

The received code may be executed by processor 504 as it is received, and/or stored in storage device 510, or other non-volatile storage for later execution. In this manner, computer system 500 may obtain application code in the form of a carrier wave.

In the foregoing specification, particular embodiments have been described. It will, however, be evident that various modifications and changes may be made thereto without departing from the broader spirit and scope of the invention. The specification and drawings are, accordingly, to be regarded in an illustrative rather than a restrictive sense.

The invention claimed is:

1. A computer-implemented method for applying one or more policy constraints in an application program, the method comprising:

executing the application program to cause a routine, contained in the application program, to be invoked, wherein invocation of the routine causes redirecting a request, to perform the routine, to a policy broker instead of the application program performing the routine, wherein the redirecting of the request to the policy broker is achieved by substituting original code contained in the routine for which a policy constraint is to be applied with replacement code that invokes a routine managed by the policy broker, wherein the replacement code includes code that invokes the routine managed by the policy broker, and wherein program code, contained in the application program, is not modified to cause the request, to perform the routine for which a policy constraint is to be applied, to be redirected to the policy broker; and the policy broker performing the routine for which a policy constraint is to be applied, wherein the policy broker causes the one or more policy constraints to be applied to the performance of the routine.

2. The method as recited in claim 1, wherein the original code is original source code and the replacement code is replacement source code.

3. The method as recited in claim 1, wherein the original code is original object code and the replacement code is replacement object code.

4. The method as recited in claim 1, wherein the one or more policy constraints include one or more security constraints.

5. A computer-readable storage medium carrying one or more sequences of one or more instructions for applying one or more policy constraints in an application program, the one or more sequences of one or more instructions including instructions which, when executed by one or more processors, causes:

executing the application program to cause a routine, contained in the application program, to be invoked, wherein invocation of the routine causes redirecting a request, to perform the routine, to a policy broker instead of the application program performing the routine, wherein the redirecting of the request to the policy broker is achieved by substituting original code contained in the routine for which a policy constraint is to be applied with replacement code that invokes a routine managed by the policy broker, wherein the replacement code includes code that invokes the routine managed by the policy broker, and wherein program code, contained in the application program, is not modified to cause the request, to perform the routine for which a policy constraint is to be applied, to be redirected to the policy broker; and the policy broker performing the routine for which a policy constraint is to be applied, wherein the policy broker causes the one or more policy constraints to be applied to the performance of the routine.

6. The computer-readable storage medium as recited in claim 5, wherein the original code is original source code and the replacement code is replacement source code.

7. The computer-readable storage medium as recited in claim 5, wherein the original code is original object code and the replacement code is replacement object code.

8. The computer-readable storage medium as recited in claim 5, wherein the one or more policy constraints include one or more security constraints.

* * * * *